J. H. Harper,
Cider Press.
No. 71,165. Patented Nov. 19, 1867.
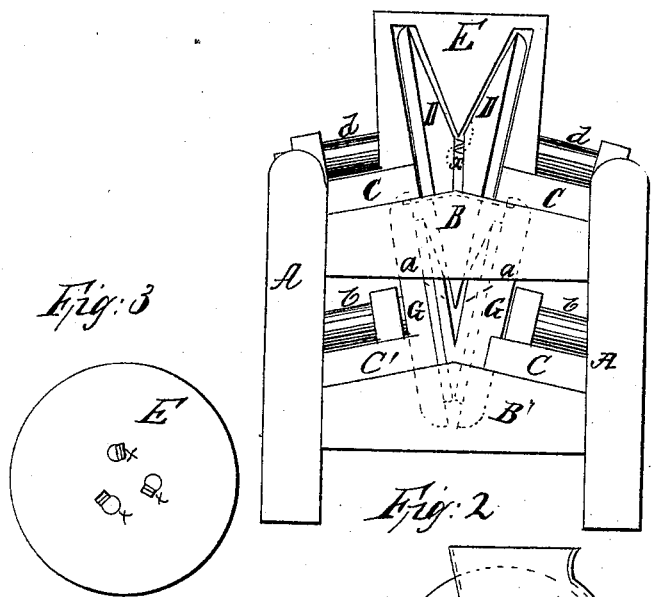
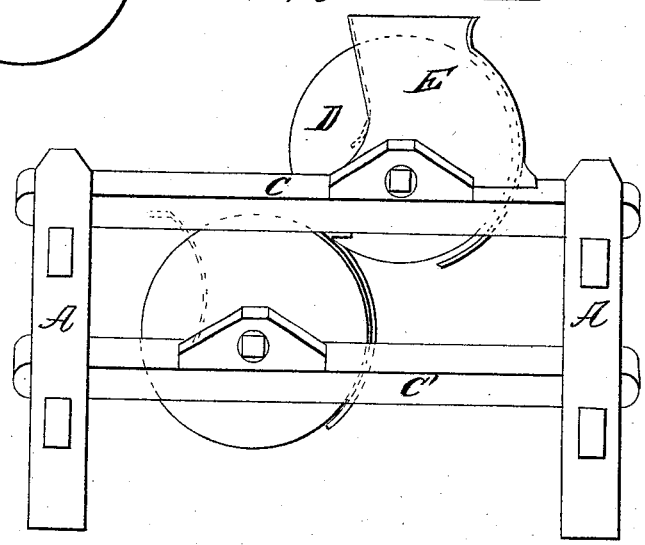
Witnesses:
Inventor:
J. H. Harper
per
Alexander Mason
Atty

United States Patent Office.

JOHN H. HARPER, OF PITTSBURG, PENNSYLVANIA.

Letters Patent No. 71,165, dated November 19, 1867.

IMPROVEMENT IN CIDER-PRESSES.

The Schedule referred to in these Letters Patent and making part of the same.

TO ALL WHOM IT MAY CONCERN:

Be it known that I, JOHN H. HARPER, of Pittsburg, in the county of Allegheny, and in the State of Pennsylvania, have invented certain new and useful Improvements in Cider-Presses; and do hereby declare that the following is a full, clear, and exact description thereof, reference being had to the accompanying drawings, and to the letters of reference marked thereon, making a part of this specification.

Figure 1 represents an end view, and

Figure 2 a side elevation of the press.

In the annexed drawings, A, B, B', C, and C' represent the framework of the press, which is constructed substantially as follows: A A represent two uprights, which are connected together by two cross-pieces B B', which said pieces are formed wider in their centres than at their ends. A section of the frame similar to this one is formed, and the two are connected together a suitable distance apart by four braces C C C' C', which are secured upon the pieces B B' close to the uprights A, thus leaving an oblong opening between them. Upon the top of the frame, near one end, is formed a hopper, E, into which are placed two circular metal disks D D, having bevelled faces, and connected to independent shafts $d\ d$, which have suitable bearings formed therefor on the braces C. Each of these disks has several lugs $x\ x$ on its bevelled face, so that whenever one of them is revolved the lugs of the opposite one catch against the revolving lug $x$ and cause the other to turn. These lugs will effectually grasp the apple or other fruit and hold the same between the disks. It will readily be seen that the disks are closer together at the bottom than at the top, which is caused by the construction of the end pieces B B in the manner described, whereby the disks form a throat for the fruit and crush the same as they revolve. Provided with independent shafts $d\ d$, and secured in like manner as the upper disks, are two metal disks G G upon the lower platform, formed by the braces C' C', which have India-rubber faces $a\ a$, as seen in fig. 1. These disks need no lugs, as they revolve by friction.

In the use of this press the standards A are so constructed as to allow the receiving-vessel to be placed under the frame. The apples or other fruit, (as this may be used as a cider, wine, or other press,) is placed in the hopper E, and the disks D D caused to revolve until the fruit is crushed and ground. The pomace is then taken from this hopper, or the vessel underneath, and placed in between the rubber-faced disks G G, and the operation again performed, as before described.

Having thus fully described my invention, what I claim as new, and desire to secure by Letters Patent, is—

The rubber-faced disks G G, upon the lower platform of the frame, as set forth, and used in combination with the disks D D, for the purposes set forth.

In testimony that I claim the foregoing, I have hereunto set my hand this 19th day of September, 1867.

JOHN H. HARPER.

Witnesses:
EDW'D LYNCH,
JNO. J. CASE.